Figure 3:
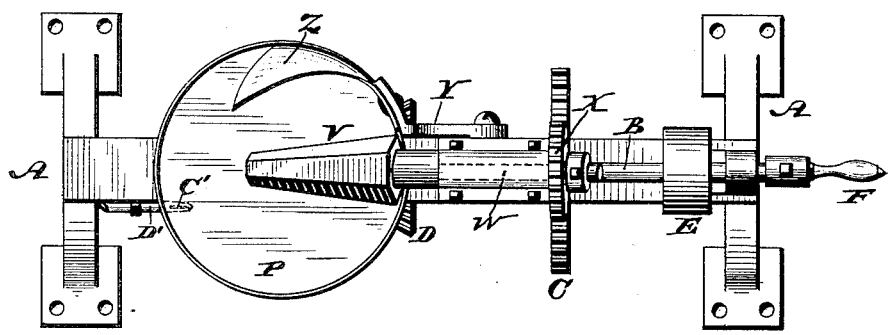

(No Model.)  2 Sheets—Sheet 1.
J. REPETTI.
DOUGH MIXER.
No. 460,992.  Patented Oct. 13, 1891.
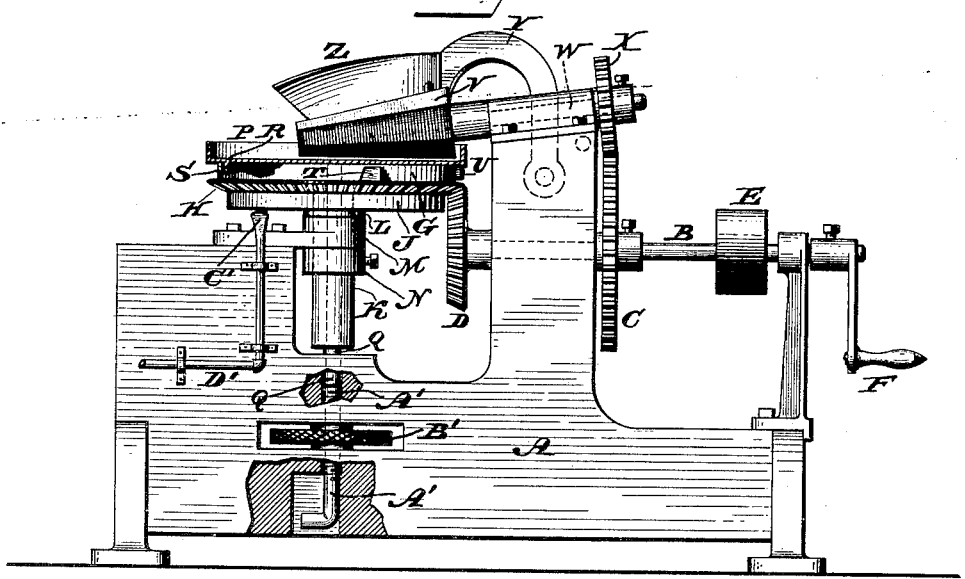
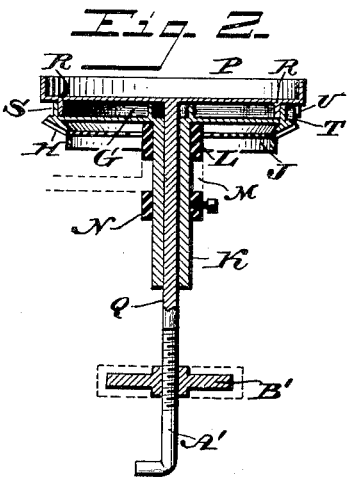
WITNESSES:
L. Douville,
Robt. Aiton
INVENTOR
Joseph Repetti
BY
ATTORNEY.

(No Model.) 2 Sheets—Sheet 2.

J. REPETTI.
DOUGH MIXER.

No. 460,992. Patented Oct. 13, 1891.

WITNESSES:
L. Douville,
Robt. Aiton.

INVENTOR
Joseph Repetti,
BY
ATTORNEY.

UNITED STATES PATENT OFFICE

JOSEPH REPETTI, OF BUENA VISTA, NEW JERSEY.

DOUGH-MIXER.

SPECIFICATION forming part of Letters Patent No. 460,992, dated October 13, 1891.

Application filed August 9, 1890. Serial No. 361,585. (No model.)

*To all whom it may concern:*

Be it known that I, JOSEPH REPETTI, a citizen of the United States, residing at Buena Vista township, in the county of Atlantic and State of New Jersey, have invented a new and useful Improvement in Dough-Mixers, which improvement is fully set forth in the following specification and accompanying drawings.

My invention relates to mixers and workers for plastic material and especially for mixing dough in bread-making; and it consists, first, of a novel roller for mixing and working the material; second, of novel means for heating the material while in the pan; third, of mechanism for simultaneously rotating the roller and pan of the device; fourth, of adjusting mechanism for regulating the position of the pan relatively to the mixing-roller. fifth, of a novel scraper, as hereinafter set forth; sixth, of the combination of parts hereinafter set forth.

Figure 1 represents a side view of a machine embodying my invention. Fig. 2 represents a central longitudinal section of a part thereof. Fig. 3 represents a plan view thereof.

Similar letters of reference indicate corresponding parts in the several figures.

Referring to the drawings, A designates a frame having journaled in uprights thereof the shaft B, provided with the gear-wheel C and the bevel-wheel D, and either a band-pulley E, for rotating the said shaft from a motor, or a crank-handle F, for operating it by hand.

G designates a rotatable water-pan having a bevel-gearing H on its periphery adapted to mesh with the bevel-wheel D, and provided with a depending rim J. The hollow support or journal K of the pan G has a peripheral shoulder L, so as to rest upon the projecting portion or box M of the frame and rotate thereon, a collar N on the journal serving to keep the same within its bearing.

P designates a mixing pan or trough having a central stem portion Q, which is adapted to be inserted in the hollow journal K, and a depending rim R, fitting in the rim S of the water-pan G. The lug T on the side of the pan G is adapted to come in contact with the lug U on the pan P, so that the two pans may be rotated together by the rotation of the shaft B and the bevel gear-wheels D and H.

A mixing-roller V, of truncated pyramidal form, has its journal or axis W, which has a bearing in the frame A, inclined so that the side of the roller which is adjacent to the bottom of the mixing-pan is parallel therewith, and the roller extends from one side of the pan in a diametric direction beyond the center of the same, for a purpose hereinafter explained.

On the journal W of the roller is mounted a gear-wheel X, meshing with the gear-wheel C of the shaft B, whereby the roller receives motion from the said shaft.

To raise or lower the pan P, and thus bring it close to or take it farther from the roller, a rod A', working in the frame A, and having its upper end bearing against the lower end of the stem Q is employed.

In a notched portion of the frame and working on the screw-threaded portion of the rod A' is a milled nut B', which has rotary but not vertical motion, so as to raise or lower the rod by its rotations.

Secured to a pivotal arm Y of the frame is a guard or scraper Z of curved longitudinal form, so as to conform to the rim of the pan, near the inner side of which it is located. The said scraper has its upper and outer end inwardly curved and is adapted to prevent the too rapid escape of the material from the roller and also keep it from splashing over the sides of the mixing-pan as it leaves the roller.

C' designates a gas-burner fed by the pipe D' from any suitable source of supply, the flame of the said burner being within the depending rim J of the water-pan G, so that the latter can readily be heated thereby and thus enabled to maintain such temperature in the mixing-pan as will keep the material therein in plastic condition.

The operation is as follows: The shaft B is rotated, whereby the gearing D and H causes the rotation of the pan G. The lug U of the mixing-pan engages with the lug T of the water-pan and causes the rotation of the former, so that the plastic material is carried to the roller V, which is rotated in the same direction by means of the gears C and X. Owing to the roller extending beyond the center of the pan all portions of the material therein are brought by the rotation of the pan under and in contact with the roller so as to be rolled by the same. The pressure also exerted by the roller causes a displacement of the particles, so that a thorough mixing is readily effected, the corners of the roller also accomplishing a more thorough mixing than if the roller was round or conical, the guard or scraper Z, as will be seen, preventing the material from splashing or overflowing the side of the pan.

The device is preferably used for mixing dough in bread-making, but is not restricted to such alone, being applicable for working and mixing other plastic materials.

Having thus described my invention, what I claim as new, and desire to secure by Letters Patent, is—

1. The combination of a rotatable water-pan, a mixing-pan adapted to rotate with said water-pan, and a rotatable roller in said mixing-pan, substantially as described.

2. The combination of a rotary water-pan, a vertically-adjustable mixing-pan adapted to rotate with said water-pan, and a roller in said mixing-pan, substantially as described.

3. The combination of a rotatable water-pan with depending rim, a burner within said rim, a mixing-pan adapted to rotate with said water-pan, and a rotary roller in said mixing-pan, substantially as described.

4. In a machine for the purpose named, the combination of a water-pan with hollow journal, a supporting-frame, a mixing-pan with a stem in said hollow journal, a rotatable roller, a movable rod abutting against said stem and having a screw-threaded portion, and a nut working in said rod and adapted to raise and lower the same, substantially as described.

5. The combination of a water-pan with a lug on its side, mechanism, substantially as described, for rotating the said pan, a mixing-pan with a lug engaged by the lug of the water-pan, a rotatable roller to rotate therewith, and mechanism, substantially as described, for vertically adjusting said mixing-pan, substantially as stated.

6. A guard or scraper for the purpose named, consisting of a plate curved in longitudinal direction and having its upper and outer end curved inwardly, substantially as and for the purpose set forth.

7. In a device for the purpose described, the combination of a rotary mixing-pan, a water-pan, a rotatable inclined roller of truncated pyramidal form having its sides parallel with the bottom of said mixing-pan, and the operating mechanism for said parts, substantially as described.

JOSEPH REPETTI.

Witnesses:
JOHN A. WIEDERSHEIM,
L. JENNINGS.